United States Patent [19]
Marini

[11] Patent Number: 5,652,637
[45] Date of Patent: Jul. 29, 1997

[54] EYEGLASSES WITH DETACHABLE TEMPLES

[76] Inventor: Martin A. Marini, 940 Candlestick Dr., Pensacola, Fla. 32514

[21] Appl. No.: 614,004

[22] Filed: Mar. 11, 1996

[51] Int. Cl.$^6$ ................................................ G02C 5/14
[52] U.S. Cl. ................................................ 354/116
[58] Field of Search ........................... 351/111, 113, 351/116, 119, 121, 153; 16/228

[56] References Cited

U.S. PATENT DOCUMENTS

| | | | |
|---|---|---|---|
| 3,762,804 | 10/1973 | Livas | 351/90 |
| 4,094,330 | 6/1978 | Jong | 135/67 |
| 4,488,792 | 12/1984 | Wagner | 351/153 |
| 4,865,437 | 9/1989 | Neuhaus | 351/116 |
| 5,035,498 | 7/1991 | Bolle | 351/116 |
| 5,381,192 | 1/1995 | Canavan et al. | 351/119 |
| 5,418,581 | 5/1995 | Conway | 351/116 |

*Primary Examiner*—Huy Mai
*Attorney, Agent, or Firm*—David Kiewit

[57] ABSTRACT

A detachable temple comprises an ear stem portion distal from a lens frame and a lens frame portion or member proximal the frame. The temple is configured so that the two pieces can be separated without disassembling a hinged joint between the lens frame and temple. The ear stem and lens frame portions are latched in a telescoping arrangement by means of a spring biased element that may be a spring-biased ball or barb fitting into a hole. The hole may be on an inward facing portion of the temple so as to conceal the mechanism from view. An advantage of the invention is that it provides an eyewear system in which one of a plurality of temples may be selected for use with a frame in order either to provide a choice of style and appearance or to fit the eyewear to a wearer's head.

8 Claims, 2 Drawing Sheets

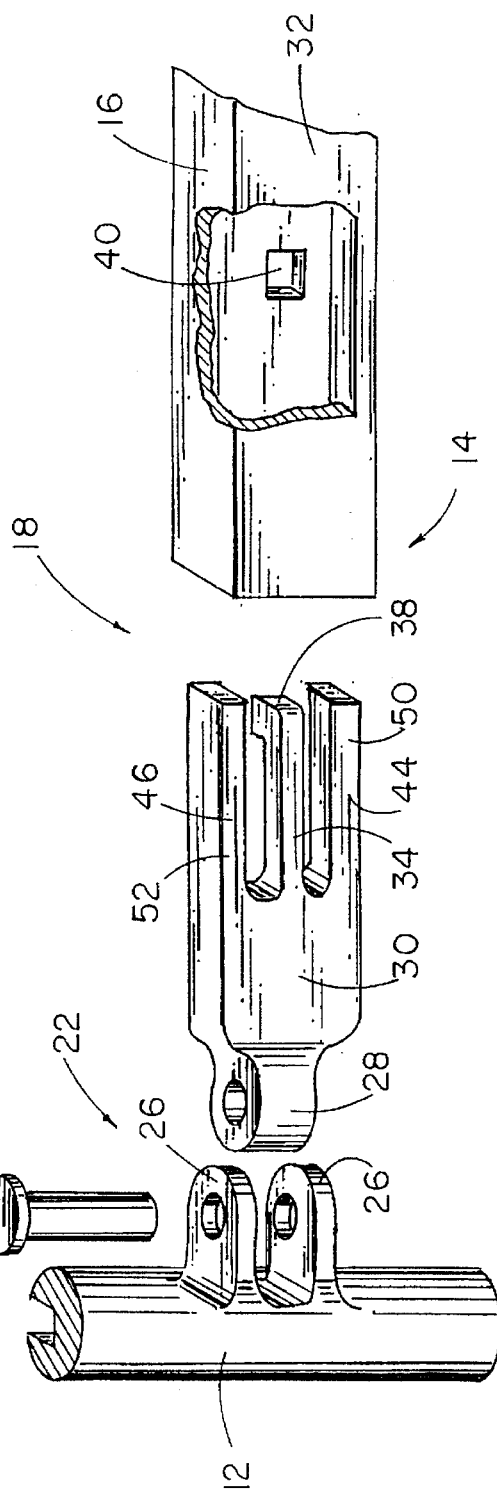
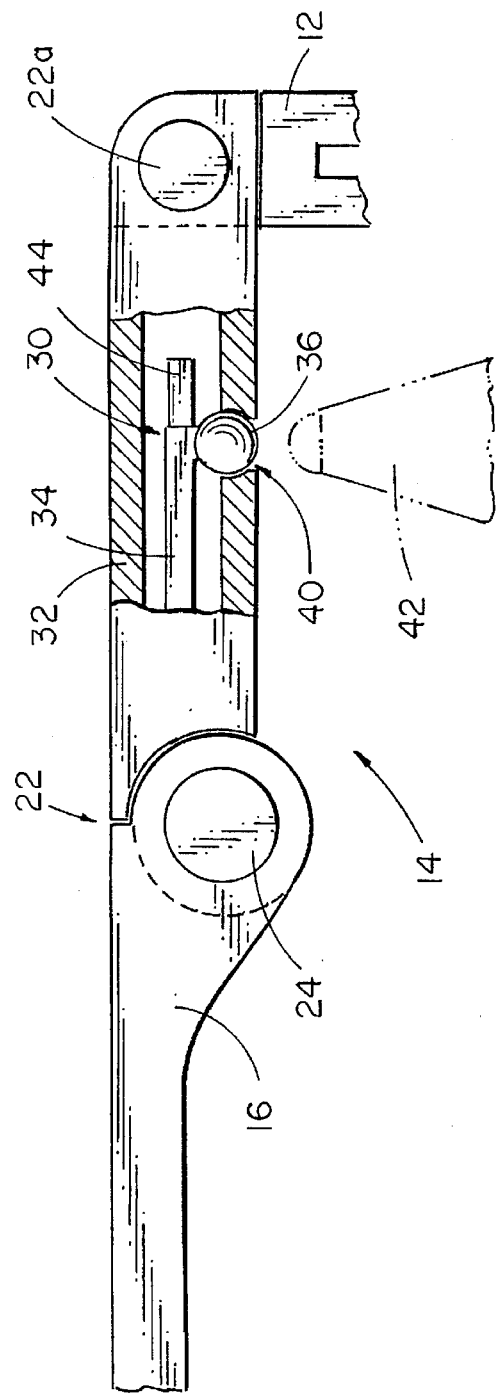
Fig. 2
Fig. 3

EYEGLASSES WITH DETACHABLE TEMPLES

BACKGROUND OF THE INVENTION

1. Field of the Invention

The present invention deals with eyeglass temples that are readily detachable without using threaded fasteners.

2. Description of Prior Art

Eyeglasses typically comprise both a front frame or eyewire for holding a lens and temples hingedly connected to the sides of the lens frame and extending rearwardly over the ears of a wearer. The temples (also called side pieces or ear stems) of eyeglasses are commonly attached to the frame by means of interlocking hinge pieces on the temple and frame. These interlocking hinge pieces have aligned throughholes so that a screw inserted through the throughholes serves as a hinge pin.

There are several known problems with conventional eyewear: the hinge pin screw may loosen and fall out; and the fine threads in one of the interlocking pieces to which the hinge screw attaches may become stripped (this is particularly true if someone tries to replace a missing screw with one that is not quite the same size). Attempts to overcome problems with the hinge screw by replacing the screw with a more permanent hinge pin (e.g., a rivet) have proven unsatisfactory and usually make it difficult or impossible to replace a temple or to selectively configure the eyewear with a custom selected temple length fitting a specific wearer.

Notable among the prior patent art related to providing detachable spectacle temples are:

- U.S. Pat. No. 5,418,581, wherein Conway teaches a snap-together eyewear hinge system comprising a front frame having a generally tee shaped member extending laterally on opposite sides thereof, and a pair of cooperating temple members that frictionally grip and hold the tee shaped member.
- U.S. Pat. No. 5,035,498, wherein Bolle' teaches the use of a spring-biased clamping means for detachably retaining side-pieces to spectacles, ski goggles or other eyewear. Bolle's arrangement uses a spring-biased pin having two shaft diameters. The pin cooperates with a mortised portion of the eyewear shield so that the shield can be separated from the temples when the narrower portion of the shaft extends through the mortise.
- U.S. 4,865,437, wherein Neuhaus discloses an eyeglass frame having holes or slots in the lateral portions thereof and a cooperating temple inserted through each slot from the front of the frame and pulled rearwardly into a locking position.
- U.S. 4,488,792, wherein Wagner teaches the use of spring arms attachable to otherwise conventional temples. A pin portion of Wagner's arm inserts through aligned throughholes in interlocking portions of the temple and a frame and thereby replaces the conventional screw as the hinge pin.
- U.S. 3,762,804, wherein Livas teaches an eyeglass frame having slots in both of its outer rim portions, the slots allowing the frame to be deformed sufficiently to allow insertion of a lens into the frame. Bores extending through the outer rims are used to attach a hinged temple member to the frame.

SUMMARY OF THE INVENTION

The invention provides eyewear having a temple portion that readily detaches at a point distal from a lens frame. The detachable temple comprises an ear stem portion distal from the frame, the ear stem portion telescoping with a lens frame portion or member proximal the frame, the two telescoping portions latched together by a spring biased element. In a preferred embodiment, a first temple member hingedly connected to an ear stem fits within a tubular member projecting rearwardly of a lens frame, the first temple member comprising a spring-biased ball or barb fitting into a coacting hole disposed on an inward facing surface of the tubular portion.

It is an object of the invention to provide eyewear temples removably attached to an eyewear frame by spring-biased retaining means concealed from view.

It is a further object of the invention to provide eyewear having a temple hingedly connected to a frame, but removable from the frame without having to disassemble the hinge.

It is yet a further object of the invention to provide an eyewear system wherein ones of a plurality of temples are attached to ones of a plurality of frames in order either to provide a choice of style and appearance or to fit the eyewear to a wearer's head.

DESCRIPTION OF THE DRAWING

FIG. 2 of the drawing is an exploded, partly cut away, side view of another embodiment of the detachable temple of the invention, the view taken from the side of the temple distal from the wearer's head when worn.

FIG. 3 of the drawing is a partial cross-sectioned top view of a preferred embodiment of the invention

DESCRIPTION OF THE PREFERRED EMBODIMENT

Figure 1:
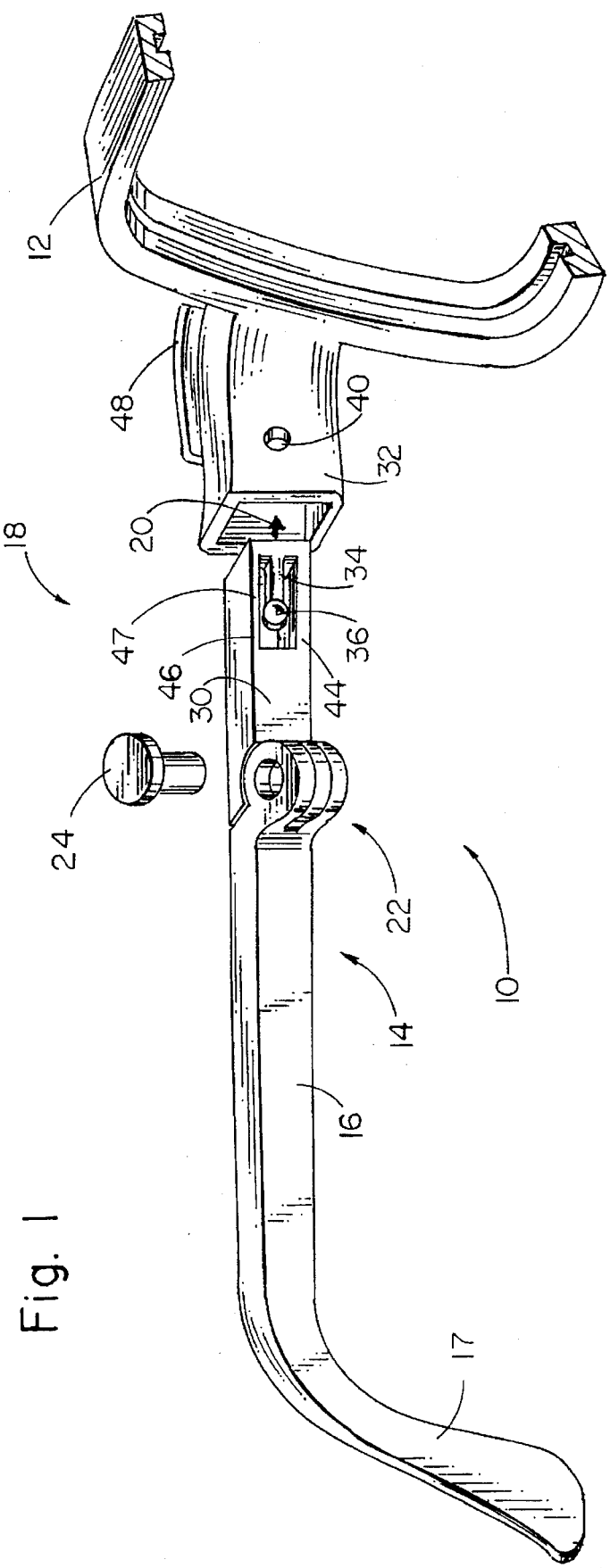
FIG. 1 of the drawing is an exploded perspective view of a preferred embodiment of a detachable temple of the invention.

Turning initially to FIG. 1 of the drawing, one finds an exploded view of eyewear 10 comprising a lens frame 12 and a temple 14. The temple 14 comprises an ear stem 16 and telescoping attachment means 18 attaching the ear stem 16 to the frame 12 when two coaxial members 30, 32 are pushed together, as indicated by the bold arrow 20 in FIG. 1. The ear stem 16 is hingedly connected to the frame 12 by means of a hinge 22 that need not be disassembled to detach the ear stem 16 from the eyewire 12. In a preferred embodiment, the hinge 22 employs a rivet 24 as a permanent hinge pin instead of the screw commonly used in the prior art.

In the preferred embodiment depicted in FIG. 1 of the drawing, the hinge 22 is disposed on the temple 14 intermediate the distal end 17 of the ear stem 16 and a telescoping attachment means 18. In other embodiments the hinge 22 may be adjacent the frame and may comprise one or more portions 26 of the frame 12 interlocking with a portion or portions 28 of the temple 14 (e.g., as shown in FIG. 2). In still other embodiments (e.g., as shown in FIG. 3) a plurality of hinges 22, 22a may be employed.

The telescoping attachment means 18 comprises a male member 30 insertable into a female member 32. In a preferred embodiment, the male member 30 comprises an axial finger 34 extending along the common axis of the male 30 and female 32 members and having a ball-shaped portion 36 disposed on the free end 38 thereof. When the male member 30 is inserted fully into the cooperating female 32 portion of the attachment means 18 the free end 38 of the axial finger 34 is biased by elastic forces into a coacting locking depression or throughhole 40 disposed in the inner wall of the female member 32. When the members 30, 32 are interfitted in this way a simple axial pull on the ear stem 16 does not disconnect the attachment means 18. The temple 14 of the invention can be conveniently disassembled by using a pointed tool 42 (which may be a ball-point pen, as shown in phantom in FIG. 3 of the drawing) to push the detent 38 on the axial finger 34 inwardly far enough that the detent 38 does not engage the hole 40, and then pulling rearwardly on the ear stem 16.

It may be noted that an incidental advantage of rigidly affixing a portion of an attachment means 18 to the frame 12 and thereby disposing the hinge 22 distal from the frame 12 is that various escutcheons 48 and other decorative treatments can be applied to the frame 12 without concern about their interfering with the operation of an adjacent hinge 22, 22a.

In the preferred embodiment of the invention the male member 30 also comprises outer portions 44, 46 (which may be parts of a frame-like element 47, as shown in FIG. 1, or that may be separate fingers 50,52, as shown in FIG. 2) that fit snugly within the female member 32 so as to maintain alignment of the temple 14 and to prevent unwanted motion between the two portions 30, 32 of the telescopically interfitted attachment means 18.

Other attachment means 18 comprising a cooperating pair of telescoping members 30, 32 can also be considered. It is well known in the manufacture of invalid walkers to provide height adjustment by means of two telescopically interfitting tubular members and a separate spring-biased element disposed within the inner of the tubes and having a detent extending through a hole in the wall of the inner tube, the detent selectively receivable in one of a plurality of coacting apertures in the outer tube. A walker of this sort is taught, inter alia, by Jong in U.S. Pat. No. 4,094,330, the disclosure of which is herein incorporated by reference.

Although it is generally preferred to have the female member 32 of the attachment means 18 directly attached to (e.g., as seen in FIG. 3) or integrally formed with (e.g., as depicted in FIG. 1) the frame 12, this is not necessarily the case. In an alternate embodiment, one could directly attach the male member 30 to the frame 12 (e.g., as shown in FIG. 2) or integrally form it therewith.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A detachable temple for eyewear, the temple comprising an ear stem and telescopic attachment means attaching the ear stem to a frame, the ear stem comprising a hinge more distal from the frame than the attachment means, the attachment means comprising a male member telescopically interfitting into a female member, the male member comprising a spring-biased finger extending along an axis of the ear stem, the spring-biased finger cooperating with a hole disposed in an inner wall of the female member to lock the two members together when telescopically interfitted the male member further comprising two outer fingers fitting snugly within the female member.

2. The detachable temple of claim 1 wherein the male member is attached to the ear stem by means of the hinge and wherein the female member is attached to the frame.

3. The detachable temple of claim 1 wherein the male member is attached to the frame and the female member is attached to the ear stem by means of the hinge.

4. The detachable temple of claim 1 wherein the hinge has a permanent hinge pin, a portion of the hinge integrally formed with one of the two members.

5. A detachable temple for eyewear comprising a frame having a decorative escutcheon adjacent a telescopic attachment attaching the frame to the temple, the temple comprising an ear stem having a hinge that is more distal from the frame than is the attachment, the attachment comprising a male member telescopically interfitting into a female member, the male member comprising a spring-biased finger cooperating with a hole disposed in an inner wall of the female member to lock the two members together when telescopically interfitted.

6. The detachable temple of claim 5 wherein the male member comprises two outer fingers fitting snugly within the female member.

7. The detachable temple of claim 5 wherein the male member is attached to the ear stem by means of the hinge and wherein the female member is attached to the frame.

8. The detachable temple of claim 5 wherein the female member is attached to the ear stem by means of the hinge and wherein the male member is attached to the frame.

* * * * *